Dec. 24, 1940.  W. E. ABBOTT ET AL  2,226,275
MAGNETIC THICKNESS GAUGE
Filed Nov. 16, 1939  2 Sheets-Sheet 1
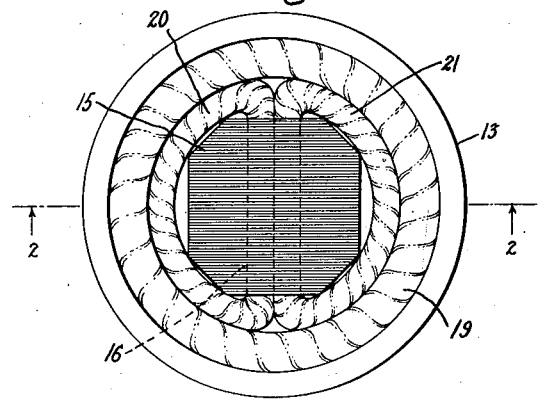
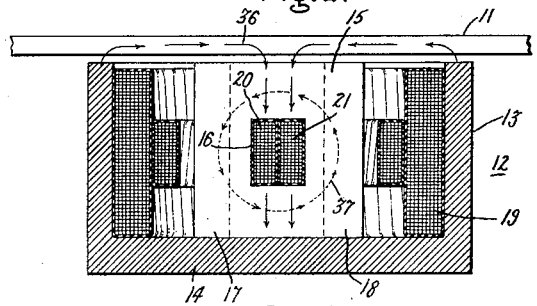
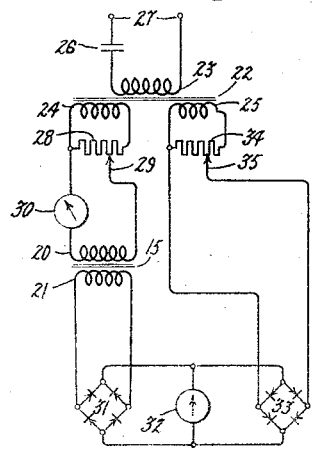 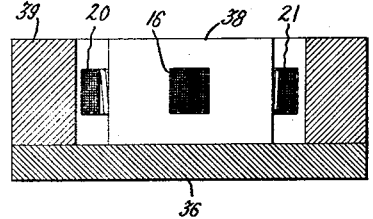
Inventors:
William E. Abbott,
Benjamin M. Smith,
by Harry E. Dunham
Their Attorney.

Dec. 24, 1940.  W. E. ABBOTT ET AL  2,226,275
MAGNETIC THICKNESS GAUGE
Filed Nov. 16, 1939  2 Sheets-Sheet 2
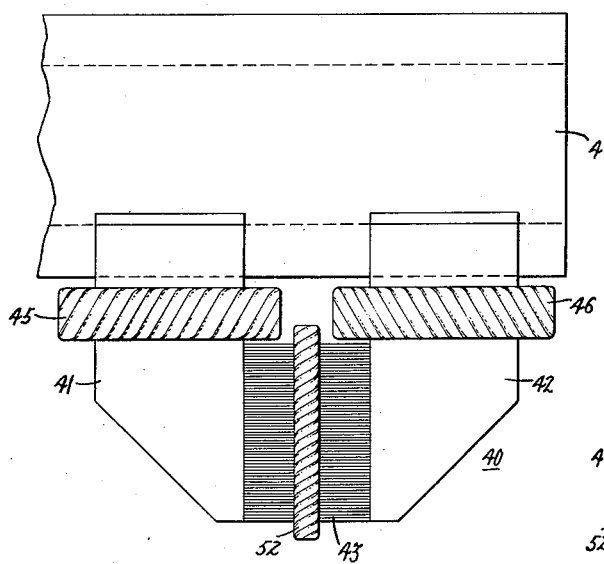
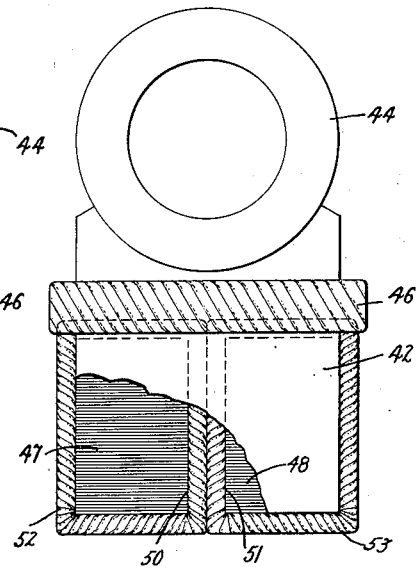
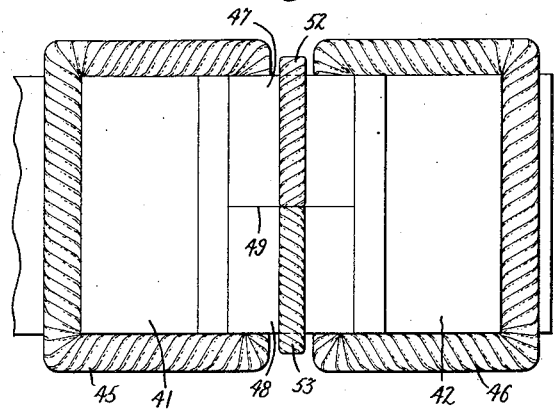
Inventors:
William E. Abbott,
Benjamin M. Smith,
by Harry E. Dunham
Their Attorney.

Patented Dec. 24, 1940

2,226,275

UNITED STATES PATENT OFFICE 2,226,275

MAGNETIC THICKNESS GAUGE

William E. Abbott and Benjamin M. Smith, Schenectady, N. Y., assignors to General Electric Company, a corporation of of New York Application November 16, 1939, Serial No. 304,806

9 Claims. (Cl. 175—183)

This invention relates to apparatus for measuring the thickness of magnetic materials and more particularly to apparatus for measuring the thickness of plates, boiler tubes, the walls of storage tanks, and the like.

It is an object of our invention to provide an improved thickness measuring gauge.

It is another object of our invention to provide improved apparatus for measuring the thickness of magnetic plates of indefinite area.

It is a further object of our invention to provide an improved gauge for measuring the thickness of tubes formed of magnetic material in which the radial thickness of the tube bears a high ratio to the tube diameter.

It is still another object of our invention to provide an improved device for measuring the thickness of plates, tubes, and the like which are accessible from one side only.

It is a still further object of our invention to provide an improved thickness gauge which is adaptable for use in measuring the thickness of thin plates as well as those of greater thickness.

Other and further objects of our invention will become apparent as the description proceeds.

In carrying out our invention in its preferred form we provide an electric gauge head having a generally cylindrical pole member and provided with a central concentric laminated pole structure. We provide a direct-current magnetizing winding or a permanent magnet for exciting the magnetic circuit with a unidirectional flux of a value sufficient to substantially saturate the magnetic material being gauged. The total flux in the unsaturated laminated core is thus a measure of the thickness of the material. To measure the flux density in the laminated core, which is a measure of the total flux in the core, use is made of the change in incremental permeability with variations in mean induction. The central core is provided with a longitudinal opening or slot thereby forming a localized magnetic circuit of rectangular section. About one of the legs of this local circuit we position an alternating-current magnetizing winding, and about one of the other legs and in inductive relation with the magnetizing winding, we position a secondary or potential winding. With a constant alternating current voltage applied to the magnetizing winding, the voltage induced in the secondary coil depends upon the unidirectional flux or mean induction in the core. It will be obvious, therefore, that the magnitude of the voltage appearing in the secondary or potential winding is a function of the thickness of the material. We provide means for measuring this voltage in terms of actual thickness or in terms of deviations from a material of standard thickness.

In a modification we have also provided an arrangement which is adaptable for measuring the thickness of tubes having an extremely high ratio of wall thickness to diameter. In this arrangement we employ a generally U-shaped magnetic core comprising two pole pieces joined together by an intermediate laminated core structure. This laminated structure is likewise provided with a longitudinal opening or slot in order to accommodate the primary and secondary windings of a transformer as already described. A unidirectional flux is produced in the core and threads the article whose thickness is being measured. Suitable means is provided for measuring the output of the transformer in terms of thickness.

The invention may be understood more readily from the following detailed description when considered in connection with the accompanying drawings, and those features of the invention which are believed to be novel and patentable will be pointed out in the appended claims.

In the drawings, Fig. 1 is a view showing the face of a gauge head constructed in accordance with our invention; Fig. 2 is a sectional view taken along the line 2—2 of Fig. 1; Fig. 3 is a schematic diagram of an electrical circuit which may be employed with our invention; Fig. 4 is a sectional view similar to Fig. 2 of a modification in which a permanent magnet is employed for producing a unidirectional flux in the core; Fig. 5 is a side elevational view of a modified gauge head constructed in accordance with our invention; Fig. 6 is a side elevational view of the same gauge head with a portion cut away; and Fig. 7 is a plan view of this same gauge.

In the drawings we have illustrated our invention employed for measuring the thickness of a plate 11 having a plane surface. It should be understood, however, that our invention may also be employed for measuring the thickness of curved surfaces as well. The apparatus of Figs. 1 and 2 includes a gauge head 12 which may be constructed of cold drawn steel, for example, and which comprises a continuous pole piece portion 13 in the form of a cylinder and a closed end portion or yoke 14. Positioned in concentric relation with the pole piece 13, and in engagement with the yoke or closed end portion 14 thereof is a laminated core structure or pole piece 15 which may be constructed of silicon steel, for example. This material has the characteristic that its incremental permeability varies appreciably with variations in flux density.

We provide the central core 15 with a longitudinal opening or slot 16 thereby forming a local magnetic circuit of substantially rectangular cross section having legs 17 and 18. By the term "continuous" pole piece, we refer to a structure having the shape of a square, rectangle, trapezoid, circle, and the like as distinguished from one of U-shape, for example. This arrangement employing a central core or pole piece and an outer surrounding pole piece confines the flux within a definite area and eliminates inefficiency which would otherwise be present due to fringing of the flux.

In order to provide a unidirectional flux for exciting the cores 13 and 15 and for passing a flux through the plate 11, we have shown a winding 19 which may be excited with direct current. This winding is positioned between the poles 13 and 15 and is arranged in concentric relation with them. We provide a magnetizing winding 20 which interlinks the leg 17 of the central core 15 and which is adapted to be energized from an alternating-current circuit. We position a second winding 21 about the leg 18 of the central core 15 which winding serves as a secondary or potential winding for the magnetizing element 20.

In Fig. 3 we have shown a schematic circuit diagram of apparatus which may be employed for measuring the potential variations in the secondary winding 21 due to variations in thickness of the plate 11. This arrangement preferably comprises a voltage regulating transformer 22 having a primary winding 23 and two secondary windings 24 and 25. The primary winding 23 is connected in circuit with a capacitance 26 to an alternating-current source of supply 27. The winding 23 is provided with a saturable core which is operated above the point of saturation. Thus, if any variations in the voltage of the source 27 take place, although the current flowing through the capacitor 26 and the winding 23 in series will vary, the flux in the core and the voltage induced in the secondary windings 24 and 25 will remain substantially constant. We connect a resistance element 28 across the secondary winding 24 in order to provide a potentiometer for adjusting the sensitivity of the measuring device. We connect the primary winding 20 to the potentiometer through a variable tap 29. If desired, an indicating instrument 30 may also be connected in circuit with the magnetizing winding 20. The potential or secondary winding 21 may be connected to a full-wave rectifier element 31, the output of which is connected to a direct-current instrument 32.

In order to improve the accuracy of the measurements and to permit the use of a null method of measurement if desired, a second rectifier element 33 is provided having its output circuit connected to the measuring instrument 32 in opposition to the output circuit of the rectifier bridge 31. The input or alternating-current side of the full-wave rectifier bridge 33 is connected to a potentiometer arrangement 34 through an adjustable tap 35. The potentiometer is in turn connected across the secondary winding 25 of the transformer 22. This arrangement provides the necessary zero adjustment.

It will be appreciated that the core or pole piece 15 is operated at a flux density below the point of saturation in order to make use of the incremental permeability as a measurement of the total flux. With this measuring circuit it will be obvious that changes in permeability of the magnetic core 15 as a result of variations in flux density with variations in thickness will result in corresponding potential variations in the secondary winding 21, and these variations will influence the indications of the measuring instrument 32. If desired, the indicating instrument 32 may be adjusted to give a zero indication for a plate of standard thickness or, if desired, a null method of measuring may be employed, and the indications of the measuring instrument 30 will then be a measure of the thickness of the material being gauged. The instrument 32 may be calibrated in terms of actual thickness or in terms of deviations from a plate of standard thickness. By the employment of the transformer 22 with the series capacitance 26, the arrangement is made substantially independent of voltage variations, and by means of the adjustable taps 29 and 35 the sensitivity and zero adjustments may be made quite readily. We wish to emphasize, however, that this measuring circuit forms no part of our invention, and it will be obvious that other measuring arrangements may be employed.

Considering now the operation of the gauge to measure the thickness of the plate 10, the gauge is first positioned with the gauge head either in contact with or in closely spaced relation to the plate 11. The direct-current winding 19 is excited to provide a unidirectional flux of a value sufficiently great to substantially saturate the plate 11. The alternating-current winding 20 is then excited from the alternating-current source 27. The unidirectional flux path is indicated by the full arrows 36. It will be seen that this flux passes from the cylindrical portion 13 of the core 12 into the plate 11 and returns through the central core 15 to the closed end portion 14 of the core 12. Since the plate 11 is substantially saturated with magnetic flux at all times, the total flux which traverses the central core 15 will thus vary in magnitude in accordance with the plate thickness, and inasmuch as the permeability of the core 15 varies in accordance with the flux density of the core this change in permeability may be employed to measure the thickness of the plate 11. The alternating-current winding 20 excited from a constant source of supply sends an alternating flux around the core 15 in a local circuit including the legs 17 and 18 and having a path represented by the dotted arrows 37. It will be seen from this that the alternating current flux is localized in the central core member 15 and does not link the plate under test. Since the central core 15 is not saturated, it will be appreciated that the magnitude of the alternating flux produced by the magnetizing winding 20, when the latter is energized with a constant current, will depend upon the incremental permeability which in turn depends upon the amount of mean induction or unidirectional flux in the core.

The employment of a gauge head in which the outer pole piece has a substantially continuous perimeter is an important feature of our invention. In the particular embodiment illustrated, in which the pole pieces are arranged in concentric relation, the flux is confined within a definite area, thus making it possible to measure the thickness of plates of indefinite area. In using the concentric arrangement of Figs. 1 and 2 it is important only that the radial thickness of the outside or cylindrical pole be slightly greater than the thickness of the plate to be measured. However, when using a laminated structure for the central pole piece 15 for measuring the flux by measuring the incremental permeability, the area of the central pole is made preferably from one and a half to twice the area of the outer pole piece, in order to obtain a linear relation between the flux density and the voltage which is read in the output instrument 32. A gauge of this type will not be affected by any pieces of ferromagnetic material which may be attached to the plate outside the area included by the poles. The importance of this feature is obvious in situations where it is desired to measure plates which are reinforced with angle iron, I-beams, and the like. Since the unidirectional flux emanating from the gauge head will penetrate the entire cross section of the plate regardless of its thickness, the gauge does not have the limitations imposed on thickness gauges using alternating current.

In Fig. 4 I have shown a modification of the magnetic circuit of Figs. 1 and 2, in which the direct current magnetizing winding 19 of the foregoing arrangement has been eliminated by the use of a permanent magnet material in the outer pole piece to produce the unidirectional flux. In the arrangement illustrated, the magnetic circuit includes a yoke member 36, a central laminated core or pole piece 38 and an outer pole piece comprising a permanent magnet element 39 of cylindrical form. The magnet 39 is preferably composed of magnetic material having a relatively high coercive force such as, for example, cobalt steel or an aluminum-nickel alloy of iron composed of approximately 6 to 15% aluminum and approximately 20 to 30% nickel, and if desired, a small percentage of cobalt.

The use of such an arrangement adds simplicity to the device by the elimination of the direct current magnetizing winding with its source of power supply, and makes possible a gauge which is especially well adapted to the measurement of thin sheets.

It will be appreciated that when a permanent magnet is employed for providing the unidirectional flux, it is important that the radial thickness of the outer pole piece be increased due to the lower flux density in the magnet element in order to provide sufficient flux to magnetically saturate the material whose thickness is to be measured. Under such conditions, the flux density in the laminated pole piece 38 will be sufficiently far below the point of saturation in order that a linear relationship may be obtained between the thickness of the plate or material and the reading of the instrument 32. The method of operation is identical to that of the apparatus already described.

In those cases where it is desired to measure the thickness of tubes having an extremely high ratio of wall thickness to diameter, the concentric pole arrangement illustrated in Figs. 1, 2 and 4 is not adaptable to such use because under such conditions the diameter of the gauge is greater than the diameter of the pipe. In Figs. 5, 6 and 7 we have illustrated a modified form of gauge head which is adaptable for measuring the thickness of tubes in which the radial thickness of the tube is large in proportion to the tube diameter. In the arrangement illustrated we employ a generally U-shaped core structure 40 for the gauge head having pole pieces 41 and 42 joined together by an intermediate laminated yoke or core structure 43. The pole pieces 41 and 42 may be constructed of a suitable magnetic material such as that employed in the construction of the pole piece 15 in the apparatus of Figs. 1 and 2. The laminated core structure 43 may likewise be constructed of a suitable material such as silicon steel having the characteristic that its incremental permeability varies in accordance with its flux density. In this arrangement the area of the pole pieces 41 and 42 is made large as compared to the thickness of the tube 44 in order substantially to saturate the wall of the tube. As illustrated in the drawings, the faces of the pole pieces 41 and 42 are constructed to conform to the shape of the tube 44 whose thickness is to be measured. We provide a plurality of windings 45 and 46 positioned about the pole pieces 41 and 42 respectively and adapted to be energized with direct current for sending a unidirectional flux through the magnetic circuit and through the wall of the tube.

In forming the intermediate laminated core structure 43 we prefer to form the core in two sections 47 and 48 which are joined together as shown at 49, and we provide each of these sections with a longitudinal slot 50 and 51 respectively which face each other and which provide a longitudinal opening for accommodating the alternating-current magnetizing winding 52 and the secondary or potential winding 53.

It will be appreciated that the direct-current windings 45 and 46 will be connected to a suitable source of direct current and that the alternating-current magnetizing winding 52 will be connected to an alternating-current source as described in connection with Figs. 1 and 2. Likewise, the potential winding 53 will be connected in a suitable measuring circuit such, for example, as that illustrated in Fig. 3. In view of the fact that the method of operation of the apparatus illustrated in Figs. 5, 6 and 7 is identical to that of Figs. 1 and 2, a description thereof is believed to be unnecessary.

The use of laminated material in forming the cores 15, 38, and 43 is an important feature of my invention. By the employment of a laminated core, as distinguished from one formed of solid material, a higher average flux density is obtained for the same magnetizing force and this flux density is more uniform. Also, the losses will be lower. Furthermore, it is desirable to have the alternating flux distributed throughout the legs of the core which carries the unidirectional flux in order to obtain the necessary change in incremental permeability with mean induction. With a laminated core the alternating flux penetrates much deeper into the iron than it otherwise would. The use of a laminated core for making the flux measurements also aids in confining the alternating flux to the central core in the case of the concentric arrangement. If for example, a solid structure were employed the alternating flux would tend to flow through the sheet being tested, the outer pole, and the yoke so that the relationship between the thickness of the plate and the voltage in the potential winding might be greatly disturbed.

We have herein shown and particularly described certain embodiments of our invention and certain methods of operation embraced therein for the purpose of explaining its principle and showing its application, but it will be obvious to those skilled in the art that other modifications and variations are possible, and we aim therefore to cover all such modifications and variations as fall within the scope of our invention which is defined in the appended claims.

What we claim as new and desire to secure by Letters Patent of the United States, is:

1. In a device for measuring the thickness of magnetic material, a gauge head comprising an open magnetic circuit including high permeability magnetic material, means for producing a unidirectional magnetic flux in said magnetic circuit, said magnetic circuit being adapted to be positioned with said open portion opposite and adjacent the surface of the magnetic material whose thickness is to be measured for sending magnetic flux through said magnetic material, the flux produced in the magnetic circuit of said gauge head being of sufficient value substantially to saturate the magnetic material whose thickness is to be measured but of insufficient value to saturate the magnetic circuit of said gauge head, said high permeability magnetic material being positioned in said magnetic circuit to be traversed by the total flux passing through said magnetic circuit and the material to be tested, and means responsive to variations in the magnitude of the flux traversing said high permeability magnetic material caused by variations in the thickness of said magnetic material.

2. In a gauge for measuring the thickness of magnetic material, a gauge head comprising a magnetic circuit having portions adapted to be positioned adjacent the surface of said material, means for producing a unidirectional flux in the magnetic circuit of said gauge head of sufficient value to magnetically saturate said material to be tested but of insufficient value to saturate the magnetic circuit of said gauge head, a portion of the magnetic circuit of said gauge head and which carries the unidirectional flux which flows through the material to be tested being composed of laminated material, said laminated material having an opening therein, said opening forming in effect a local magnetic circuit in said laminated portion, means for producing an alternating flux in said local magnetic circuit, said alternating flux being variable in accordance with changes in the incremental permeability of said laminated material caused by variations in the magnitude of said unidirectional flux due to materials of different thickness being tested, and means responsive to the magnitude of said alternating flux.

3. In a device for measuring the thickness of magnetic material, a yoke of relatively high permeability material, a central pole piece secured to said yoke and formed of relatively high permeability material, means for producing a unidirectional flux in said yoke and central pole piece which is variable in accordance with the thickness of said magnetic material, said means including a continuous pole piece of magnetizable material arranged in the magnetic circuit of said central pole piece and said yoke, and means responsive to variations in the magnitude of the flux in said central pole piece.

4. In a device for measuring the thickness of magnetic material, a yoke of high permeability magnetic material, a central pole piece of magnetic material positioned in fixed relation with respect to said yoke, and a continuous pole piece arranged around said central pole piece and positioned in the magnetic circuit of said yoke and central pole piece, a source of magnetomotive force for producing a unidirectional flux in said magnetic circuit, said flux being variable in accordance with the thickness of the material to be gauged, and means responsive to variations in the incremental permeability of said central pole piece.

5. In a device for measuring the thickness of magnetic material, a magnetic circuit comprising a pole piece having a substantially continuous marginal edge, a central pole piece, and an intermediate flux carrying member, said central pole piece having a transverse opening therein, a winding positioned between said pole pieces and adapted to be energized by direct current for producing a unidirectional flux in said magnetic circuit and the material whose thickness is to be measured, a winding positioned about a leg of said central pole piece formed by said opening and adapted to be energized from an alternating current source of supply for producing an alternating flux in said central pole piece the magnitude of which varies in accordance with the magnitude of said unidirectional flux, and means responsive to variations in the magnitude of said alternating flux.

6. In a device for measuring the thickness of magnetic material, a magnetic circuit of substantially E-shape cross section comprising a yoke, a central core and an outer cylindrical pole piece arranged in substantially concentric relation with said central core, said central core being formed of laminated high permeability material and having a transverse opening therethrough, a winding adapted to be energized by direct current positioned in the space between said core and said outer pole piece for producing a unidirectional magnetic flux in said magnetic circuit and the material whose thickness is to be measured, said unidirectional flux being of sufficient magnitude to saturate said material but of insufficient magnitude to saturate said central core, and said flux being variable in accordance with the thickness of said material, a transformer having primary and secondary windings, said primary winding being positioned about a leg formed in said central pole piece by said opening, and said secondary winding being arranged to respond to an alternating flux produced in said central core by said primary winding.

7. In a device for measuring the thickness of tubes of magnetic material, a magnetic circuit of substantially U-shape, said circuit comprising pole pieces having faces conforming to the surface of said tubes and a yoke member of laminated high permeability material for carrying the flux from one pole to the other, means for producing a unidirectional flux in said magnetic circuit and the wall of a tube whose thickness is to be measured, means for producing an alternating flux in said yoke member which varies with said unidirectional flux, and means for measuring said alternating flux.

8. In a gauge for measuring the thickness of magnetic material, a magnetic circuit comprising a laminated central pole piece of high permeability material and having an opening therethrough, a substantially cylindrical member arranged in substantially concentric relation with said central pole piece, and a member of magnetic material included in the circuit between said central pole piece and said cylindrical member, said cylindrical member being composed of high coercive force material and permanently magnetized for producing a unidirectional flux in said magnetic circuit which varies with the thickness of said material, an alternating current winding positioned in the opening of said core and about a leg of said central pole piece formed by said opening for producing an alternating flux in said central pole piece which varies in accordance with the unidirectional flux in said pole piece, and means including a secondary winding responsive to said alternating flux.

9. In a device for testing the thickness of magnetic material, a yoke of high permeability magnetic material, a central pole piece of high permeability magnetic material positioned in fixed relation with respect to said yoke, a continuous pole piece composed of relatively high coercive force magnetic material arranged around said central pole piece and positioned in the magnetic circuit of said yoke and central pole piece, said continuous pole piece being permanently magnetized for providing a unidirectional flux in said magnetic circuit the magnitude of which is variable in accordance with the thickness of the material to be tested, said central pole piece being constructed with an opening therethrough, a transformer having primary and secondary windings, said windings having portions positioned in said opening and arranged to interlink said central core, said primary winding being adapted to be energized with alternating current for producing in said central core a localized alternating flux, and means responsive to the voltage induced in said secondary winding, said voltage being determined by changes in the incremental permeability of said central core due to variations in the magnitude of said unidirectional flux in accordance with variations in the thickness of said magnetic material.

WILLIAM E. ABBOTT.
BENJAMIN M. SMITH.